(12) United States Patent
Öttinger et al.

(10) Patent No.: US 7,704,405 B2
(45) Date of Patent: Apr. 27, 2010

(54) MATERIAL MIXTURES FOR HEAT STORAGE SYSTEMS AND PRODUCTION METHOD

(75) Inventors: Oswin Öttinger, Meitingen (DE); Jürgen Bacher, Wertingen/Reatshofen (DE)

(73) Assignee: SGL Carbon SE, Wiesbaden (DE)

( * ) Notice: Subject to any disclaimer, the term of this patent is extended or adjusted under 35 U.S.C. 154(b) by 293 days.

(21) Appl. No.: 10/695,367

(22) Filed: Oct. 28, 2003

(65) Prior Publication Data

US 2004/0084658 A1 May 6, 2004

(30) Foreign Application Priority Data

Oct. 28, 2002 (DE) ................. 102 50 249

(51) Int. Cl.
C09K 5/06 (2006.01)
F25B 29/00 (2006.01)
(52) U.S. Cl. .................... 252/70; 252/71; 252/502; 524/495; 524/496; 165/42; 165/61; 361/700; 361/704; 361/709; 423/448; 423/460; 264/328.18
(58) Field of Classification Search ............. 252/70–71, 252/73, 74, 79, 500, 502; 361/700, 704, 361/709; 165/42, 61; 524/495, 496; 264/328.18; 428/143, 323; 423/448, 460
See application file for complete search history.

(56) References Cited

U.S. PATENT DOCUMENTS

| | | | | |
|---|---|---|---|---|
| 3,361,684 A * | 1/1968 | Chvatal | ...................... | 252/478 |
| 3,404,061 A | 10/1968 | Shane et al. | | |
| 4,244,934 A * | 1/1981 | Kondo et al. | ................. | 423/448 |
| 4,400,433 A * | 8/1983 | Ishiguro et al. | ............. | 428/408 |
| 4,595,774 A | 6/1986 | Coste et al. | | |
| 4,906,258 A * | 3/1990 | Balat et al. | ..................... | 95/141 |
| 4,971,726 A * | 11/1990 | Maeno et al. | ................ | 252/511 |
| 5,094,780 A * | 3/1992 | von Bonin | .................. | 252/606 |
| 5,130,199 A * | 7/1992 | Howard | ....................... | 428/408 |
| 5,294,300 A * | 3/1994 | Kusuyama | ............... | 162/157.3 |
| 5,330,680 A * | 7/1994 | Sakawaki et al. | ............. | 516/32 |
| 5,382,387 A * | 1/1995 | von Bonin | .................. | 252/602 |
| 5,415,791 A * | 5/1995 | Chou et al. | ................. | 508/103 |
| 5,607,889 A * | 3/1997 | Prosdocimi et al. | .......... | 502/80 |
| 5,882,570 A * | 3/1999 | Hayward | ............... | 264/328.18 |
| 5,981,448 A * | 11/1999 | Matsui et al. | ................ | 508/101 |
| 6,130,265 A * | 10/2000 | Glueck et al. | ................ | 521/56 |
| 6,538,892 B2 * | 3/2003 | Smalc | ........................ | 361/710 |
| 6,620,359 B1 * | 9/2003 | Meza et al. | .................. | 264/115 |
| 2002/0016505 A1 * | 2/2002 | Gally et al. | .................... | 564/28 |
| 2002/0033247 A1 * | 3/2002 | Neuschutz et al. | ............ | 165/10 |
| 2002/0060063 A1 * | 5/2002 | Neuschutz et al. | ............ | 165/61 |
| 2005/0007740 A1 * | 1/2005 | Neuschuetz et al. | ......... | 361/704 |

FOREIGN PATENT DOCUMENTS

| | | | |
|---|---|---|---|
| CH | 636 119 | | 5/1983 |
| DE | 196 30 073 A1 | | 1/1998 |
| DE | 19630073 A1 | * | 1/1998 |
| DE | WO 98/04644 | * | 2/1998 |
| DE | 100 18 938 A1 | | 10/2001 |
| DE | 100 23 572 A1 | | 11/2001 |
| DE | 101 57 671 A1 | | 6/2003 |
| DE | WO 03/046982 | * | 6/2003 |
| JP | 63-023993 | * | 2/1986 |
| JP | 63-023993 | * | 2/1988 |

OTHER PUBLICATIONS

TIMCAL, Data Sheet, 2004, p. 1.*
Tamme, "Phase Change Storage Systems," Workshop on Thermal Storage for Trough power Systems, Feb. 20-21, Golden, Co, USA. pp. 1-21.*
Xiao et al, "Preparation and Performance of Shape stabilized Phase Change Thermal Storage Materials with High Thermal Conductivity," Energy Conversion and Management, Jan. 2002, 43, 103-106.*
Bader, "Microencapsulated Paraffin in Polyethylene for Thermal Energy Storage," Thesis, Feb. 2002, The University of Auckland, pp. 1-59.*
Exfoliated Graphite, IUPAC Compendium of Chemical Technology, 1997.*
Mineral Oil, Wikipedia, 2007, pp. 1-4.*
Polyethylene, Wikipedia, 2007, pp. 1-5.*
Nylon, Wikipedia, 2007, pp. 1-5.*
Umanskaya et al, "Lubricating Greases based on Expanded Graphite in Vasrious Media," J. Chemistry and Fuels, 1987, 23(4), 175-177, Abstract.*
"Technical Data Sheet on Graphite," Graphit Kropmuhl Ag, 2008, p. 1.*
"Expandable Flake Graphite" Ashbury Carbon, 2008, p. 1-14.*

(Continued)

Primary Examiner—Stanley Silverman
Assistant Examiner—Kallambella Vijayakumar
(74) Attorney, Agent, or Firm—Laurence A. Greenberg; Werner H. Stemer; Ralph E. Locher

(57) ABSTRACT

A mixture for heat storage devices has a phase change material and particulate expanded graphite. The material mixtures are produced by mixing phase change material and expanded graphite as powders or in molten form, and shaping the mixtures into shaped bodies.

10 Claims, No Drawings

OTHER PUBLICATIONS

Chernysh et al, "Formation of thermally expanded graphite," J. Powder Metalluurgy and Metal Ceramics, 1991, 30(6), p. 459-461.*

Mixture, Extract from Merriam Webster Dictionary, 2008, p. 1.*

Min Xiao et al.: "Preparation and performance of shape stabilized phase change thermal storage materials with high thermal conductivity", *Energy Conversion and Management,* No. 43, 2002, pp. 103-108.

* cited by examiner

MATERIAL MIXTURES FOR HEAT STORAGE SYSTEMS AND PRODUCTION METHOD

BACKGROUND OF THE INVENTION

1. Field of the Invention

The invention relates to mixtures of a phase change material and particulate expanded graphite, to heat stores containing mixtures of this type, and to processes for producing them. Phase change materials (PCMs) are suitable for storing thermal energy in the form of latent heat. The term phase change materials is understood to mean substances which undergo a phase transition at a given temperature when heat is supplied or removed, for example a phase transition from the solid phase to the liquid phase (melting) or from the liquid phase to the solid phase (solidification), such as the pairing ice and water at the freezing point of the latter. It is preferable for their volume-specific enthalpies of transition at the corresponding temperature to be over 100 KJ/dm$^3$. German patent application DE 100 18 938 describes phase change materials which undergo a phase transition without changing their state of aggregation, specifically a transformation between a solid low-temperature modification and a solid high-temperature modification. If heat is supplied to or extracted from a phase change material, its temperature when the phase transition point is reached remains constant for a sufficient time for the material to be completely converted into the other modification. The heat content that is fed in or dissipated during the phase transition and does not effect a temperature change in the material is referred to as latent heat (enthalpy of transition), while heat which is fed in or dissipated and does cause a temperature change in the material is referred to as sensible heat.

The storage of heat as latent heat in a phase change material is advantageous for the following reasons: slight temperature changes (in the vicinity of the phase transition temperature) allow large amounts of heat to be stored, while the fact that the temperature is constant for a prolonged period of time during the phase change makes it possible to smooth out temperature fluctuations at the transition temperature of the phase change material in question, and heat losses to the environment are only low compared to the storage of sensible heat, since in the latter case the temperature difference with respect to the environment rises continuously as a result of the heating of the storage medium.

One drawback for the practical use of phase change materials in heat storage devices ("latent heat storage devices") is the fact that the thermal conductivity of these materials is usually low. Consequently, these heat storage devices are charged up and discharged relatively slowly.

The charging and discharging time of latent heat storage devices can be reduced if the phase change material is introduced into a porous body which contains a matrix made from a material with a high thermal conductivity. For example, it has been proposed in German patent application DE 196 30 073 to impregnate a porous matrix of graphite in vacuo with a "solid-liquid" phase change material which is in the liquid phase. According to the terminology for composite materials proposed by the society of German engineers, VDI (Verein deutscher Ingenieure), a latent heat storage device of this type belongs to the group of "Durchdringungs-Verbund-werkstoffe," which may be translated as penetration composite materials (Lexikon Werkstofftechnik [Materials Science Dictionary], Ed. H. Gräfen; VDI Verlag Dusseldorf 1993).

The impregnation can be effected by immersing the porous body in a liquid phase change material, by applying reduced pressure to the porous body and then relaxing the pressure or by applying excess pressure during contact with the phase change material, referred to below as the immersion, vacuum or vacuum-pressure methods. The simple immersion method can only be used if the phase change material wets the matrix of the porous body. Vacuum or vacuum-pressure impregnation have to be used if the phase change material does not wet or scarcely wets the matrix of the porous body.

However, the production of latent heat storage devices with an increased thermal conductivity by introducing a phase change material into a thermally conductive matrix by means of impregnation has significant drawbacks: for the impregnation operation, the phase change material has to be in the liquid phase and it is scarcely possible to add solid auxiliaries, such as for example nucleating agents, a high outlay in terms of time and equipment is required for impregnation with phase change materials which do not greatly wet the matrix, or else it is impossible to produce a composite with a sufficiently high phase change material content and a low pore content, the composition of some phase change materials, for example salt hydrates, may change when a reduced pressure is applied, so that they cannot be used as latent heat storage device material, and the shaping of the latent heat storage device is restricted to shapes in which the porous body which forms the matrix can be produced.

It has been proposed in the published patent application US 2002/0016505 A1 to add an auxiliary which has a high thermal conductivity, for example metal powder, metal granules or graphite powder, to the phase change material. Specifically, Example 2 of the above patent application describes 2 g of didodecylammonium chloride as phase change material being milled together with 2 g of synthetic graphite KS6 and pressed to form a shaped body. The advantages of this procedure consist in the variable shaping using economic compacting processes which can be used on a large industrial scale, e.g. tablet formation or extrusion, and the possibility of processing solid phase change materials and phase change materials with solid additives, e.g. nucleating agents. Alternatively, application as a bulk material in a latent heat storage device vessel interspersed with heat exchanger profiles is possible.

A latent heat storage material in accordance with US 2002/0016505 A1 would, according to the terminology proposed by the above-noted society of German engineers, VDI, be regarded as a particle composite material, since discrete particles of one component are incorporated into another component.

Unlike with the graphite matrix impregnated with the phase change material described in DE 196 30 073, however, the particles of the thermally conductive auxiliary in mixtures with phase change materials do not necessarily form a conductive framework which encloses the phase change material. Therefore, in the latter case the thermal conductivity of the latent heat storage material is inevitably lower. A significant drawback when using metal chips or synthetic graphite powder as thermally conductive auxiliaries therefore consists in the fact that relatively high quantities of the thermally conductive auxiliary are required if the thermal conductivity of the latent heat storage material is to be significantly increased (cf. the above example from US 2002/0016505 A1). This reduces the energy density of the latent heat storage device.

SUMMARY OF THE INVENTION

It is accordingly an object of the invention to provide a composition for a heat storage device which overcomes the above-mentioned disadvantages of the heretofore-known devices and methods of this general type, i.e., to provide a latent heat storage material with a high storage capacity based on a phase change material which has an increased thermal conductivity, so that faster charging and discharging of the latent heat storage device is possible, and which can be produced without the drawbacks of the impregnation process.

With the foregoing and other objects in view there is provided, in accordance with the invention, a material mixture, comprising an amount of a phase change material and an amount of particulate expanded graphite mixed with the phase change material.

In other words, the objects of the invention are achieved with a mixture of expanded graphite in particle form and a phase change material. Surprisingly, it has emerged that even relatively small volumetric amounts of particles of expanded graphite can achieve a significant increase in the thermal conductivity of the heat storage material. The rise in the thermal conductivity of a heat storage material containing expanded graphite in particle form as a thermally conductive auxiliary is surprisingly higher by a multiple than the increase in the thermal conductivity of a phase change material containing a corresponding proportion by volume of synthetic graphite.

The production of expanded graphite and products made from expanded graphite is known from U.S. Pat. No. 3,404,061. To produce expanded graphite, graphite inclusion compounds or graphite salts, e.g. graphite hydrogen sulfate or graphite nitrate, are subjected to sudden (shock) heating. The so-called expanded graphite product which is formed consists of aggregates in worm or concertina form. The bulk density of expanded graphite product is in the range from 2 to 20 g/l, preferably from 2 to 7 g/l.

By compacting this expanded graphite product under pressure, it is possible to produce self-supporting graphite foils or plates which are currently used primarily as sealing material, without having to add binder. If compacted or "precompacted" expanded graphite product of this type is comminuted with the aid of cutting, impact and/or jet mills, a powder or chopped product comprising precompacted expanded graphite product is obtained, depending on the degree of comminution. The bulk density of the powders produced in this way is typically in the range from 60 to 200 g/l. These powders can be mixed homogeneously in a fine distribution into press compounds.

Alternatively, it is also possible for expanded graphite product to be comminuted directly, e.g. without prior compacting, to form a powder which can be mixed into press compounds.

Powders or chopped products made from compacted expanded graphite product can be reexpanded if this is required for further use. A process of this type is described in U.S. Pat. No. 5,882,570. This results in what is known as a reexpanded graphite powder (reexpanded product).

In the context of the description of the present invention, the term "expanded graphite" is used as a collective term for (i) expanded graphite product, (ii) powder or chopped product obtained by comminution of compacted expanded graphite product, (iii) powder obtained by comminution of expanded graphite product, and (iv) reexpanded product produced by reexpanding comminuted, compacted expanded graphite product. All forms (i) to (iv) of the expanded graphite are suitable for use as a thermally conductive auxiliary in latent heat storage materials according to the invention. The expanded graphite product has a bulk density of from 2 to 20 g/l, the comminuted expanded graphite product has a bulk density of from 20 to 150 g/l, the comminuted, compacted expanded graphite product has a bulk density of from 60 to 200 g/l, and the reexpanded, compacted expanded graphite product has a bulk density of from 20 to 150 g/l.

All phase change materials which are inert with respect to expanded graphite in the range of useful temperatures can be employed in the heat stores according to the invention.

Suitable phase change materials are in particular those with a phase transition temperature in the range from −100° C. to +500° C., for example paraffins, sugar alcohols, gas hydrates, water, aqueous salt solutions, salt-water eutectics, salt hydrates and mixtures thereof, salts and eutectic mixtures thereof, alkali metal hydroxides and mixtures of salts and alkali metal hydroxides. The phase change material is selected according to the temperature range in which the latent heat storage device is used. Auxiliaries, e.g. nucleating agents, are added to the phase change material as required in order to prevent supercooling during the solidification process.

The advantages of the heat storage systems according to the invention which contain expanded graphite over a heat storage system containing the same amount by volume of synthetic graphite can be attributed, inter alia, to the particular quality, structure and morphology of expanded graphite. However, the invention is not tied to this specific explanation.

The crystal structure of the expanded graphite corresponds far more closely to the ideal graphite layer plane structure than the structure in the more isotropic particles of standard synthetic graphites, and consequently the thermal conductivity of the expanded graphite is higher. Further characteristics of the expanded graphite are its microporosity and the high aspect ratio of the particles.

On account of the microporosity and the shape of the particles, the specific surface area (determined using the BET method) of expanded graphite is greater than the specific surface area, determined using the same method, of synthetic graphite of similar particle size. For example, the synthetic graphite KS6 produced by Timcal which is used in Example 2 of the above-noted US 2002/0016505 A1 has a specific surface area of 20 m$^2$/g with a level of over 90% of particles whose (mean) diameter is less than 6 μm. In the case of expanded graphite with a mean particle size of approx. 5 μm, the specific surface area, determined in accordance with the BET method, is typically between 25 and 40 m$^2$/g. Although the BET surface area of the expanded graphite decreases as the diameter of the particles increases, it remains at a relatively high level. For example, expanded graphite with a mean particle size of 5 mm still has a BET surface area of more than 10 m$^2$/g. Expanded graphite with mean particle sizes in the range from 5 μm to 5 mm is suitable for the production of a heat store according to the invention. Expanded graphite with a mean particle size in the range from 5 μm to 5 mm, particularly preferably in the range from 50 μm to 1 mm, is preferred.

The high specific surface area of the expanded graphite in the heat stores according to the invention causes the available surface area for the heat transfer between phase change material and thermally conductive auxiliary incorporated therein to increase. Furthermore, the porous surface of the expanded graphite particles has the advantage that the phase change material is held securely in the pores after the transition to the liquid state, so that it is impossible for any material to escape from the heat store.

The porous structure of the expanded graphite additionally causes the phase change material in combination with expanded graphite to be in a state similar to that of an encapsulation. As a result, macroscopic segregation phenomena within the phase change material are as far as possible suppressed. Therefore, in the heat stores according to the invention it is also possible to use phase change materials which are otherwise unsuitable for use in latent heat storage devices on account of the fact that they are highly prone to segregation phenomena.

Materials for heat stores to which particles (powder or chopped product) formed from comminuted graphite foil have been added as thermally conductive auxiliary have thermal conductivities of the same order of magnitude as latent heat storage materials with a corresponding proportion by volume of uncompacted expanded graphite product. The use of comminuted graphite foil as thermally conductive auxiliary in heat stores is economically particularly advantageous, since in this way it is possible to make use of waste from the production of objects made from graphite foil, for example seals. A further advantage of the powders or chopped products made from comminuted graphite foil consists in the fact that these particles can be mixed more easily into the phase change material compared to expanded graphite product, since they are less bulky than expanded-product particles. On the other hand, however, it is also possible to reexpand the particles obtained by comminution of graphite foil again and for the reexpanded graphite powder (reexpanded product) to be used as the thermally conductive auxiliary in heat stores in accordance with the invention.

The expanded graphite forms from 5 to 40%, preferably from 5 to 20%, and particularly preferably from 7 to 15%, by volume of the heat stores according to the invention. A lower volumetric content of expanded graphite is relatively ineffective, since the graphite particles are then substantially isolated from one another. Moreover, a volumetric content of less than 5% is not sufficient to achieve the above-described effect of encapsulation and in this way to prevent segregation phenomena from occurring within the phase change material. If the volumetric content of graphite were to be higher, the advantage of the increased thermal conductivity would be overcompensated for by the reduction in the energy density of the store, since the increase in the graphite content is to the detriment of the heat-storing phase change material content.

The invention also relates to a process for producing the mixtures of phase change materials and expanded graphite, to the shaping of these mixtures and to the processing to form heat stores and their use form.

In the mixtures according to the invention which are used as heat storage material, there is an intimate interconnection of phase change material and expanded graphite incorporated therein, so that heat transfer between the two materials is readily possible. This intimate mixture of phase change material and expanded graphite is achieved by mixing the powders of the constituents using suitable mixing processes, for example stirring, mixing in a powder mixer, kneading or rolling. Phase change materials with a solid-liquid phase change can also be mixed with expanded graphite when they are in the liquid (molten) state. The mixtures do not have any inhomogeneities which can be detected without technical equipment.

The mixing of phase change material and thermally conductive auxiliary is particularly advantageously carried out by means of the preparation processes which are known from plastics technology for the production of compounds, e.g. kneading and subsequent granulation. Preparation by means of an extruder, for example a twin-screw extruder, is particularly preferred. The advantage of this process consists in the fact that the phase change material is melted. On account of the continuous mixing of the graphite into the liquid phase of the molten phase change material, it is possible to achieve a greater degree of homogeneity than with a powder mixing process. In this way, it is also possible in particular for phase change materials with a solid-liquid transition at particularly high transformation temperatures (300° C. to 500° C.) to be intimately mixed with the expanded graphite.

The latent heat storage materials according to the invention can be used as a bed of bulk material or as shaped bodies.

Shaped bodies which can be used as heat stores can be manufactured from the heat storage material according to the invention by shaping processes using pressure which are known, for example, from plastics technology, such as extrusion, pressing and injection molding. Powder mixtures can be compacted, for example by shaking, shaping with a jolting molding machine (also referred to as jar-ram molding or jolt ramming machine), and pressing. Depending on the production process, these shaped bodies may have a highly anisotropic thermal conductivity. This property should be taken into account in the design of the shaped body. The shaped body is preferably arranged in such a way that the direction with the higher thermal conductivity is toward the desired heat transfer, i.e. is oriented toward a heat exchanger profile or an object whose temperature is to be controlled. For applications in which this is not feasible, it is alternatively possible to use a bulk bed of the latent heat storage material according to the invention, which is introduced into a latent heat storage vessel interspersed with heat exchanger profiles. For this use variant, the latent heat storage material is provided as a mixture in powder form or as free-flowing granules.

The process according to the invention for producing heat stores makes it possible to use various types of phase change materials. The phase change may be either a transition between the liquid phase and the solid phase or a transition between different solid phases. The phase transition temperatures of the phase change materials which are suitable for the latent heat storage material according to the invention lie in the range from −100° C. to +500° C. When using phase transition temperatures of over 500° C., increased care has to be taken to protect the graphite from oxidative attack from atmospheric oxygen.

A further advantage of the process according to the invention for producing heat stores over the infiltration process described in German published patent application DE 196 30 073 consists in the fact that nucleating agents can be added to the phase change material in order to prevent supercooling during solidification. The nucleating agent should form no more than 2% by volume of the latent heat storage material, since the volumetric content of the nucleating agent is at the expense of the volumetric content of the heat-storing phase change material. Therefore, it is necessary to use nucleating agents which significantly reduce the supercooling of the phase change material in even a low concentration. Examples of nucleating agents which are suitable for the sodium acetate trihydrate system are tetrasodium diphosphate decahydrate and sodium hydrogen phosphate.

The heat storage materials according to the invention can be used in heat stores for example for controlling the temperature of buildings, for the air-conditioning of vehicles, for the cooling of electronic components or for the storage of solar heat.

Other features which are considered as characteristic for the invention are set forth in the appended claims.

Although the invention is illustrated and described herein as embodied in mixtures for heat stores, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments and examples.

DESCRIPTION OF THE PREFERRED EMBODIMENTS

EXAMPLE 1

Commercially available graphite hydrogen sulfate SS3 (Sumikin Chemical Co., Ltd; Tokyo, Japan) was shock-heated to 1000° C. The expanded product obtained in this way had a bulk density of 3 to 4 g/l. Some of this expanded product was compacted to form a graphite foil with a density of 1.0 g/cm$^3$. The graphite foil was comminuted using a cutting mill, and the chopped product obtained was comminuted more finely in a further step using a jet mill. A screen analysis of the expanded graphite powder produced in this way showed that 50% of the particles of the powder were smaller than 180 μm and 95% of the particles were smaller than 600 μm. The bulk density of the powder was in the range from 100 to 120 g/l.

Then, mixtures of the phase change material sodium acetate trihydrate (Merck, Darmstadt, melting point 58° C., in powder form) with 10% by volume of expanded graphite product or 10% by volume of the powder obtained by milling graphite foil were produced. Expanded graphite and the phase change material in powder form were mixed using an anchor agitator until no inhomogeneities were visible without the use of technical equipment. The mixtures obtained in this way were preheated to 50° C. and pressed under a pressure of 25 MPa to form cylindrical shaped bodies with a diameter of 90 mm and a height of 10 mm. The thermal conductivity of the latent heat storage materials obtained in this way was measured parallel and perpendicular to the direction of pressing. The phase change material was in the solid state during the measurement of the thermal conductivity. The measurement results are compiled in Table 1.

COMPARATIVE EXAMPLE TO EXAMPLE 1

The process from Example 1 was repeated, but the synthetic graphites KS6 and KS150 (Timcal, Switzerland) were used instead of the expanded graphite product or the powder formed from comminuted graphite foil. According to manufacturer details, the mean particle size is 3 to 4 μm in the case of KS6 and approx. 50 μm in the case of KS150. Mixtures of the phase change material sodium acetate trihydrate with 10% by volume of KS6 or 10% by volume of KS150 were produced and pressed into shaped bodies in the same way as in Example 1. For further comparison with the latent heat storage material according to the invention, a shaped body was likewise produced from the pure phase change material sodium acetate trihydrate.

The thermal conductivities of these comparison materials were measured parallel and perpendicular to the direction of pressing, in the same way as in Example 1. The phase change material was in the solid state during the measurement of the thermal conductivity. The measurement results can be seen in Table 1.

EXAMPLE 2

Analogously to Example 1, a mixture of sodium acetate trihydrate, milled graphite foil and tetrasodium diphosphate decahydrate was produced and pressed. The individual substances formed 89, 10 and 1% by volume of the mixture.

A sample of the pressed, homogenous mixture was heated to 70° C. in a DSC apparatus (TA instruments) and then cooled again to room temperature. During this temperature cycle, the heat flow was measured. This operation was repeated a number of times. The heating and cooling rate was 0.25 K/min. For comparison purposes, a specimen of pure sodium acetate trihydrate was analyzed using the same temperature program. The peak temperatures from the DSC curves are given in Table 2.

As shown in Table 2, the specimen of pure sodium acetate trihydrate did not solidify during cooling. Therefore, no peak which can be assigned to the melting operation was found during the heating segment of the subsequent temperature cycle. This was not the case with the mixture of sodium acetate trihydrate, milled graphite foil and tetrasodium diphosphate decahydrate. In this case, the DSC curve had a peak caused by the melting operation in the heating segment and a peak caused by the solidification operation in the cooling segment. The measurable supercooling in this specimen was in the range from 5 to 7 K, while with the pure phase change material supercooling of more than 30 K was recorded.

EXAMPLE 3

The phase change material Paraffin RT50 (Rubitherm, Hamburg) with a melting point of 54.5° C. and an addition of milled graphite foil chopped products were mixed in a twin-screw extruder ZSK 50 (Werner und Pfleiderer) in the molten state and then granulated. The graphite formed 10% by volume of the granules. Mixing was carried out in accordance with the following parameters:

| | |
|---|---|
| Screw rotational speed: | 97 min$^{-1}$ |
| Resistance: | 17% |
| Outlet temperature: | 66° C. |
| Material pressure: | 42 bar |
| Delivery worm supply: | 400 min$^{-1}$ |
| Temperature zones: (TC2 to 10): | 40/41/61/61/61/50/47/40/40° C. |

Specimen bodies in plate form with dimensions of 90×54×3 mm$^3$ were produced from the granular material obtained in this way by means of injection molding. The gate was in the center of the shorter edge faces of the plate. An injection-molding machine KM65 produced by Krauss-Maffei with a standard screw was used.

The following parameters were used in the injection molding of the plates:

| | |
|---|---|
| Injection rate: | 100 mm/s |
| Injection time: | 0.52 s |
| Injection pressure: | 500 bar |
| Holding pressure: | 130 bar |
| Holding pressure time: | 2 s |
| Platen cooling temperature: | 24 to 30° C. |
| Feed section temperature: | 25° C. |
| Temperature zones (1 to 5): | 40/45/50/50/50° C. |

The thermal conductivity of the specimen body in the plate plane was 4.4±0.2 W/(m·K). In the plate plane, the thermal conductivity is independent of the orientation (longitudinal or transverse) with respect to the injection direction. Perpendicular to the plate plane, the thermal conductivity was 1.7±0.1 W/(m·K). The thermal conductivity of the pure phase change material Paraffin RT 50 in the solid state without the addition of heat-conducting auxiliaries was 0.2 W/(m·K) in accordance with the manufacturer's details.

This example shows that even 10% by volume of expanded graphite makes it possible to increase the thermal conductivity by a factor of 10 to 25, depending on direction, compared to the pure phase change material.

TABLE 1

Thermal conductivity of the specimens of Example 1 and of the Comparative Example to Example 1

| Sample composition | Ratio of % by volume of PCM and graphite | Thermal conductivity W/(m · K) | |
|---|---|---|---|
| | | Perpendicular to direction of pressing | Parallel to direction of pressing |
| Sodium acetate trihydrate/ expanded graphite product | 90/10 | 9.1 ± 1 | 3.6 ± 1 |
| Sodium acetate trihydrate/milled graphite foil | 90/10 | 9.3 ± 1 | 5.3 ± 1 |
| Sodium acetate trihydrate/KS6 | 90/10 | 1.6 ± 0.2 | 1.9 ± 0.2 |
| Sodium acetate trihydrate/KS150 | 90/10 | 2.0 ± 0.2 | 1.6 ± 0.2 |
| Sodium acetate trihydrate | 100/0 | 0.6 ± 0.1 | 0.6 ± 0.1 |

TABLE 2

Melting and solidification temperatures

| Specimen composition | Peak temperatures in ° C. | |
|---|---|---|
| | Heating segment of temperature cycle | Cooling segment of temperature cycle |
| Sodium acetate trihydrate | 57.85 | No peak |
| Sodium acetate trihydrate/milled graphite foil/ tetrasodium-diphosphate decahydrate | 57.84 | 50.69 |

We claim:

1. A heat storage device, comprising:
   a heat storage material mixture having an amount of a phase change material and an amount of particulate expanded graphite mixed with said phase change material,
   wherein the expanded graphite is present in an amount of 5 to 40% by volume and is formed of particles comprising comminuted, compacted expanded graphite product with a bulk density of from 60 to 200 g/l and a mean particle diameter of 5 μm to 5 mm.

2. The heat storage device according to claim 1, which further comprises a nucleating agent for a phase transition of the phase change material.

3. The heat storage device according to claim 2, wherein said nucleating agent is present in an amount of at most 2% by volume of the mixture.

4. The heat storage device according to claim 1, wherein said phase change material has a phase transition temperature in a range from −100° C. to +500° C. and is a material selected from the group consisting of paraffins, sugar alcohols, gas hydrates, water, aqueous salt solutions, salt-water eutectics, salt hydrates, mixtures of salt hydrates, salts and eutectic mixtures of salts, alkali metal hydroxides, and mixtures of salts and alkali metal hydroxides.

5. A method for producing a heat storage device, which comprises:
   mixing an amount of expanded graphite and an amount of phase change material to produce the heat storage device according to claim 1, wherein the expanded graphite is present in an amount of 5 to 40% by volume and is formed of particles comprising comminuted, compacted expanded graphite product with a bulk density of from 60 to 200 g/l and a mean particle diameter of 5 μm to 5 mm; and
   shaping the mixture under pressure to form a shaped body.

6. The method according to claim 5, wherein the mixing step comprises mixing a powder of the expanded graphite with a powder of the phase change material.

7. The method according to claim 5, wherein the mixing step comprises melting the phase change material and mixing expanded graphite into the molten phase change material.

8. The method according to claim 5, wherein the shaping step comprises pressing the materials into the form of a shaped body.

9. The method according to claim 5, which comprises forming the shaped body with anisotropic thermal conductivity by one of extrusion and injection molding.

10. The method according to claim 5, which comprises forming the shaped body having anisotropic thermal conductivity with a jolting molding machine.

* * * * *